C. JENKINS.
POTATO GRADER.
APPLICATION FILED FEB. 21, 1919.
1,345,858.
Patented July 6, 1920.
3 SHEETS—SHEET 3.
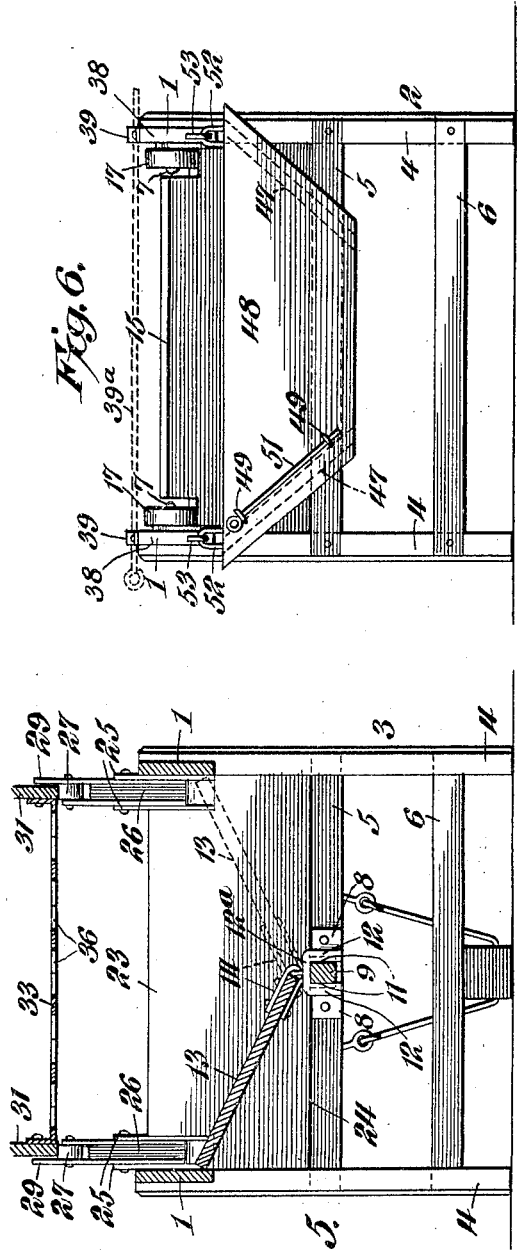
WITNESSES
Howard D. Orr.
F. T. Chapman
Charles Jenkins, INVENTOR,
BY C. G. Siggers
ATTORNEY

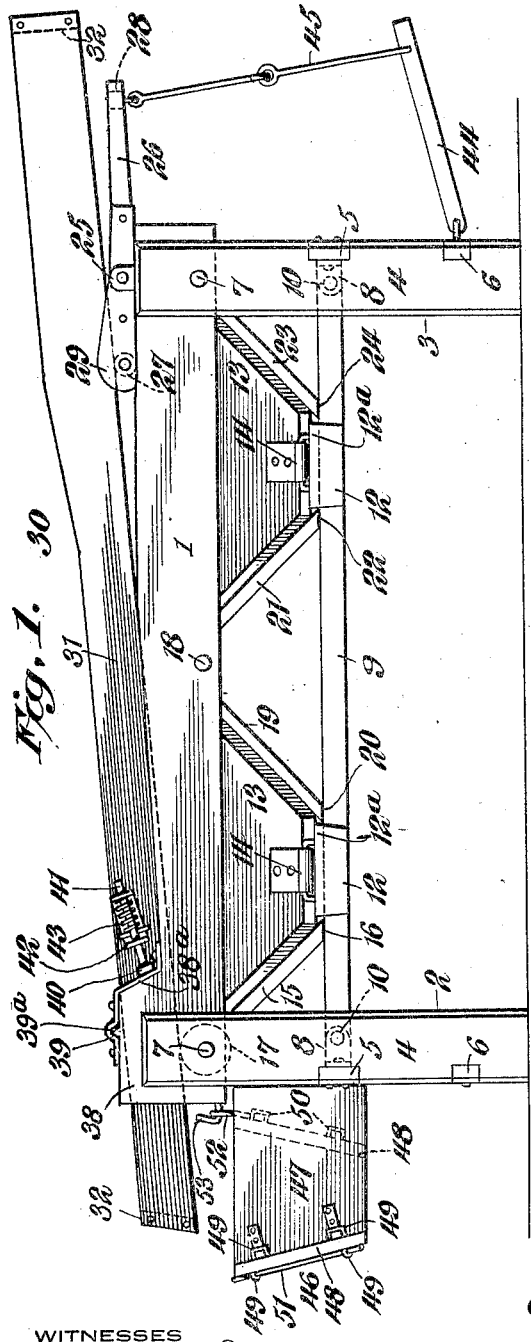

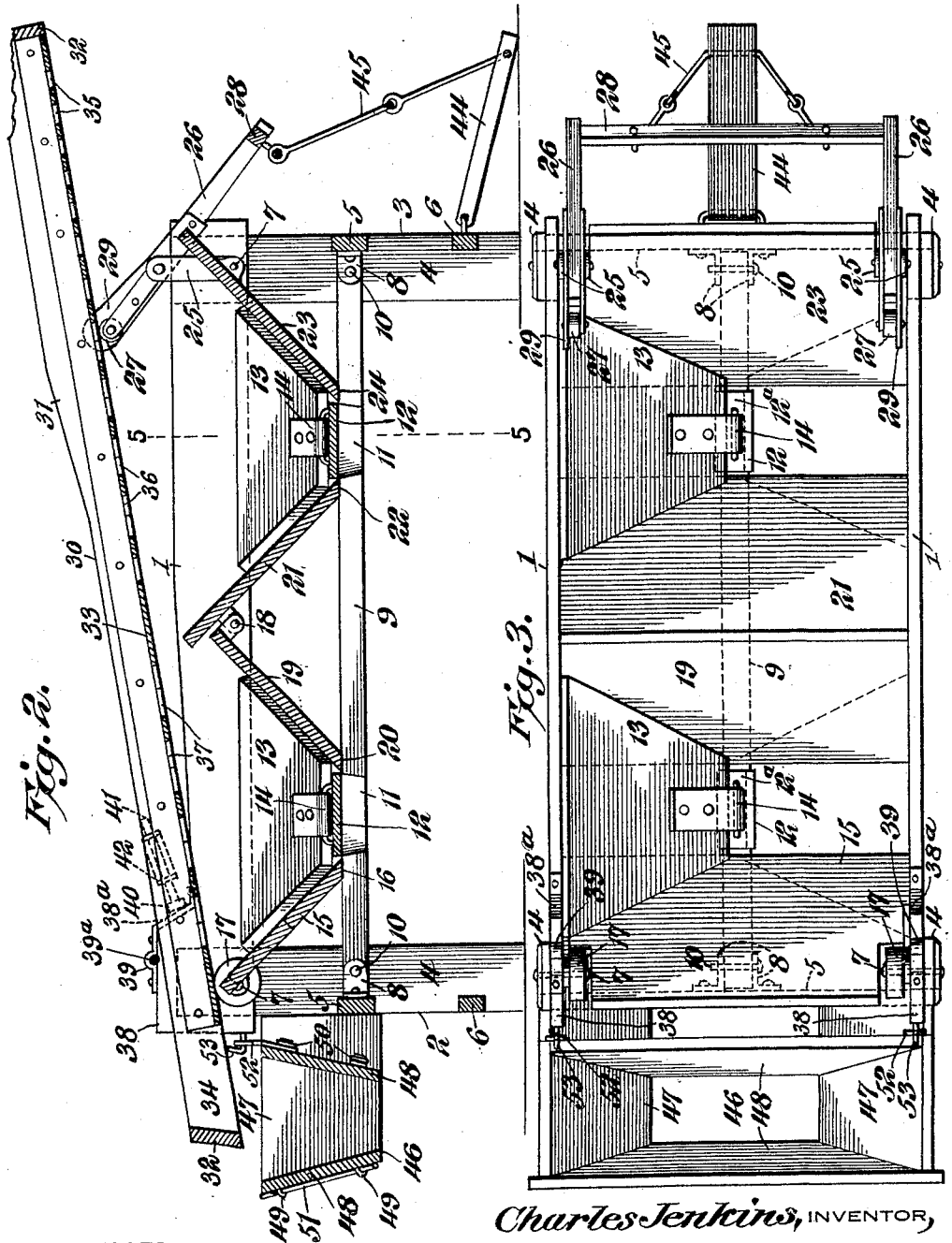

UNITED STATES PATENT OFFICE.

CHARLES JENKINS, OF DELEVAN, NEW YORK.

POTATO-GRADER.

1,345,858.     Specification of Letters Patent.     Patented July 6, 1920.

Application filed February 21, 1919. Serial No. 278,386.

*To all whom it may concern:*

Be it known that I, CHARLES JENKINS, a citizen of the United States, residing at Delevan, in the county of Cattaraugus and State of New York, have invented a new and useful Potato-Grader, of which the following is a specification.

This invention has reference to potato graders, and its object is to provide an apparatus for the purpose of simple construction, one which is readily assembled for use or dismantled and packed for storage or transportation. The grader comprises an elongated chute along which the potatoes may travel, which chute is so constructed as to discharge dirt from the potatoes, separate culls from the mass of potatoes moving along the chute, then separate seed potatoes and finally direct the choice potatoes into a hopper from which the selected potatoes may be discharged for storage or transportation. The grader includes structures whereby the chute may be inclined to chosen degrees to vary the speed of travel of the potatoes along the chute and provision is made for oscillating the chute to cause acceleration of travel of the potatoes and distribution of the potatoes to cause rapidity of grading.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation of the grader with the grader chute in the line of least inclination.

Fig. 2 is a longitudinal section of the grader with the potato chute inclined to about its limit.

Fig. 3 is a plan view of the structure shown with the chute removed.

Fig. 4 is a plan view of the potato chute showing the arrangement of screens or openings for separating the different materials.

Fig. 5 is a section on the line 5—5 of Fig. 2.

Fig. 6 is an elevation of the left hand end of the grader shown in Fig. 1.

Fig. 7 is a longitudinal section of the grader in the folded or knocked down condition.

Fig. 8 is a perspective view of one of the deflector boards.

Referring to the drawings, there is shown a main frame composed of side bars 1 joined at the ends by leg frames 2, 3 respectively. Each leg frame comprises a leg 4 connected by strips 5, 6 bracing and spacing the legs of the particular frame. At what constitutes the upper ends of the leg frames, when in supporting position, are pivots 7 by means of which the leg frames and side bars are connected together in a manner permitting folding of the leg frames into substantially parallel relation to the side bars, this permitting a close folding together of the parts.

The bars 5 of the two leg frames are each provided on the face toward the other bar with spaced ears 8 adapted to receive between them the corresponding ends of a reach 9 held between the ears by pins 10. Either leg frame may thus be folded inwardly against the side bars 1 while the other leg frame will extend outwardly. At suitable points on the reach recesses 11 are provided on opposite sides thereof to receive the legs 12 of clips 12$^a$. Each clip carries a slanting and tapering deflecting board 13 connected to the yoke portion of the clip 12$^a$ by a hinge 14. The recesses 11 also taper and the clips 12$^a$ have a similar taper in the leg portions 12, the taper of the clips being shown in Fig. 1 and the taper of the recesses being shown in Fig. 2. In this manner the clips, and the deflector boards 13 carried thereby are held frictionally onto the reach to hold their positions but may be removed from the reach at will, thus facilitating the assembling and taking down of the machine.

Mounted on the pivots 7 connecting the side bars 1 to the leg frame 2, is a hopper board 15 with the edge remote from the pivoted end of the board beveled, as shown at 16, so that it may rest solidly on the reach 9 to be supported thereby at an inclination, which inclination corresponds to the slant of the deflector board 13 carried by the reach adjacent to the board 15 when the latter is in the installed position. The pivots 7 carrying the boards 15 also serve as journals or spindles for rollers 17. Pivoted by means of pins 18 or in other manner on and between the side bars 1 is another board 19 similar to the board 15 and constituting the other member of a hopper to which the boards 15 and 13 belong. The board 19 on the edge remote from the pivot 18 is beveled, as shown at 20, to rest upon the reach 9. The two hopper boards 15 and 19 slant at angles corresponding to the taper of the deflector board 13. Mounted on the pivots 18 is another hopper board 21 with a beveled lower end 22, and supported by the pivot pins 7, which connect the leg frame 3 to the bars 1, is another hopper board 23 having its lower end 24 beveled as the other hopper boards. The hopper boards 21 and 23 are related to receive between them another taper deflector board 13 similar in all respects to the first described taper board 13 and performing a like function. The main frame of the machine as represented by the two bars 1 is therefore, in the particular showing of the drawings, provided with two hoppers, each having a deflector board 13 and each supported by the reach 9 in suitably spaced relation and each having a narrow mouth at the lower end constituting a discharge opening, the deflector boards 13 serving to direct material deposited in the hoppers to one side or the other of the grader as the operator may desire.

Attached to each side bar 1 where the board 23 is pivoted thereto and rising above said pivoted connection are supports 25 between which rock-arms or levers 26 are pivoted. These levers have a range of movement to elevate one end of each above the top of the side bars 1 and each lever there carries a roller 27. The other ends of the levers 26 are connected by a cross strip 28 by means of which the levers may be simultaneously moved. Each lever 26 at the end carrying the roller 27 is provided with an exteriorly located guide plate 29.

Adapted to rest upon and be supported by the rollers 17 and 27 is a chute 30 shown separately in Fig. 4 in plan view and also appearing in others of the views. The chute has longitudinal and end members 31 and 32 respectively, constituting a frame with a bottom 33 which may be of sheet metal and of a length approaching that of the chute frame but stopping short of one end thereof to leave a space 34. The bottom 33 is provided near the end remote from the opening 34 with a series of narrow or slot-like openings 35 each extending crosswise of the bottom 33. Following the slots or openings 35 is a group of perforations 36 in turn followed by another group of perforations 37, which latter are of larger size than the perforations 36.

The slots 35 are designed to permit the escape of dirt and small debris carried by potatoes dumped on the corresponding end of the chute while the perforations or openings 36 are of a size to permit the passage therethrough of particularly small potatoes. The perforations or passages 37 are made of a size to permit the passage of seed potatoes and the opening 34 permits the passage of potatoes larger than seed potatoes. The purpose of the chute is therefore to first separate dirt and other debris from the mass of potatoes deposited on the chute, then to separate particularly small potatoes from the mass, then to select seed potatoes and finally to discharge from the chute the remainder of the potatoes which are large or choice potatoes.

The chute is carried by the rollers 17 and 27, which rollers are so positioned as to underride the side members 31 of the frame of the chute. In order to distribute potatoes placed on the chute the latter is reciprocated lengthwise, which operation may be conveniently performed by hand. The reciprocation of the chute is facilitated by the roller mounting or support of the chute, one end of the chute being guided by the plates 29 and the other end adjacent to where the chute is supported on the rollers 17 being guided by upstanding extensions 38 of the side bars 1, or in any other suitable manner. The extensions 38 also serve as carriers for abutment brackets 38$^a$ having extensions 39 traversed by a rod 39$^a$ overriding and holding the chute above the rollers 17. The abutment brackets 38$^a$ are engaged by the headed ends 40 of pins 41 carried by guides 42 fast to the outer surfaces of the sides 31 of the chute. The pins 41 where within the guides are surrounded by compression springs 43 and constitute elastic holding devices for yieldingly limiting lengthwise movement of the chute toward the discharge end of the grader. The chute may be tilted to an appropriate extent by rocking the connected arms 26, thereby raising or lowering the rollers 27 and correspondingly raising or lowering the receiving end of the chute so that the grading bottom or screen 33 is inclined to cause the potatoes deposited on its upper end to gravitate toward the lower end. The gravitating movement of the potatoes is accelerated by the reciprocation of the chute. The degree of inclination of the chute is determined by a treadle 44 hinged to the cross strip 6 of the leg 3 and connected by a flexible or jointed loop 45 to the cross bar or strip 28. In this way an operator may reciprocate the chute and at the same time change its degree of inclination at will, thereby regulating the travel of the potatoes from the receiving to the discharge end of the chute.

The perforations or passages 36 are so located that they direct the small or refuse potatoes into the hopper near the receiving end of the device. The passages 37 overlie the hopper near the discharge end of the chute. Beneath the opening 34 there is located another hopper 46 comprising end members 47 and face members 48, the latter being about as long as the width of the chute. The face members and end members are joined by hinges 49, 50, with the hinges 49 connecting one end member 47 with the corresponding face member 48 having a pintle 51 common to the hinge members 49 thereat so that on removal of the pintle the hopper 46 may be laid out or folded flat for storage. One end of each end member 47 is continued beyond the corresponding face member 48 to engage the adjacent leg frame 2, the hopper 46 having eyes 52 to engage over hooks 53 on the corresponding ends of the side bars 1 and thereby sustain the hopper 46 in position under the opening 34.

The various parts of the grader are hinged and are capable of separation from other parts in order that the grader as a whole may be collapsed into small compass for storage or transportation, or may be assembled in operative form with facility and speed. If the grader be assembled as shown in Fig. 1, it may be readily collapsed into the condition shown in Fig. 7 by removing the rod 39 and then the chute 30, and the deflector boards 13. Then push the machine forward and it will fold flat. The hopper boards 15, 19, 21 and 23 fold together into the space between the side bars 1, and the leg frames 2 and 3 fold lengthwise the side bars, these leg frames being sufficiently spaced to straddle the side bars. The treadle 44 folds in line with the corresponding leg frame 3 and the arms or levers 26 fold into substantially parallel relation with the side bars 1 between them. This folding of the parts is facilitated by the flexibility or jointing of the loop 45. The chute may then be placed upon the rollers 17 and 27 in a manner similar to that shown in Fig. 1, thus collapsing the structure into small compass. The hopper 46 is collapsed by withdrawing the pintle 51, thus permitting the separation of the end pieces 47 and face members 48 which with the deflecting boards 13 may be laid in the chute.

What is claimed is:—

1. A potato grader comprising a support, an inclined reciprocatory grading chute on the support, means for varying the inclination thereof, and elastic means between the chute and support yieldable in the direction of reciprocation of the chute and comprising spring retained slidable pins on the chute and fixed abutments on the support in the path of the pins, said pins engaging with said abutments whatever the adjustment of inclination of the chute.

2. A potato grader comprising a support, a reciprocatory grading chute mounted on the support, rockable arms mounted at one end of the support for sustaining and guiding one end of the chute, and means for rocking the arms to vary the inclination of the chute.

3. A potato grader comprising an elongated reciprocable grading chute having roller supports near opposite ends upon which the chute may be reciprocated by hand, the rollers supporting one end of the chute having means for adjusting them to vary the inclination of the chute, said adjusting means being foot operable while the chute is being manually reciprocated.

4. A potato grader, comprising a support, a grading chute adapted to rest thereon, and rollers on the support for directly upholding the chute, the rollers at one end of the support being movable up and down with respect thereto to vary the inclination of the chute.

5. A potato grader, comprising a support, a reciprocatory grading chute mounted on the support, rockable arms mounted at one end of the support for sustaining one end of the chute, rollers carried by said arms and bearing against the chute, and means for rocking the arms to vary the inclination of the chute.

6. A potato grader, comprising a support, a grading chute mounted upon the support, rollers on the support for sustaining the chute, rockable arms pivoted to the support and adapted to vary the inclination of the chute, and means for rocking the arms, said arms having means whereby they engage with the chute to guide the movement thereof.

7. A potato grader, comprising a frame, rollers mounted in the frame, abutments also carried by the frame, a chute mounted on the frame and supported by the rollers, and elastic means carried by the chute and adapted to engage the abutments, the chute being free from connection with the rollers whereby the chute may be removed without separating any parts.

8. A potato grader, comprising an elongated reciprocable grading chute having roller supports near opposite ends upon which the chute may be reciprocated by hand, the rollers supporting one end of the chute having means for adjusting them up and down to vary the inclination of the chute, said adjusting means being operable from the same end at which the chute is being reciprocated.

9. A potato grader provided with an elongated reciprocable grading chute, supporting rollers for the chute near one end of the grader, other supporting rollers for the chute near the other end of the grader, a rock lever structure carrying the second-named rollers, and means for manipulating the rock lever structure to vary the inclination of the chute at will while the chute is being reciprocated.

10. A potato grader provided with an elongated reciprocable grading chute, supporting rollers for the chute near one end of the grader, other supporting rollers for the chute near the other end of the grader, a rock lever structure carrying the second-named rollers, and means for manipulating the rock lever structure to vary the inclination of the chute at will while the chute is being reciprocated, said rock lever structure being provided with a treadle whereby the adjustment of the rock lever structure may be effected by the foot of an operator while the reciprocation of the chute is caused by the hands of the operator.

11. A potato grader, comprising a supporting frame having a hopper, a reach bar extending beneath the opening of the hopper, and a hinged deflector board fitted in the hopper and provided with means detachably engaging the reach bar.

12. A potato grader comprising a supporting frame having a series of hoppers spaced apart on the frame, a bar extending beneath the openings of all the hoppers, hinged deflector boards arranged within each hopper, and means detachably connecting the deflector boards to the said bar.

13. A potato grader, comprising a supporting frame provided with hopper boards spaced apart to leave an opening at the bottom, a reach bar extending across the openings, and a deflector board fitted between any two of the hopper boards and provided with a clip detachably engaging the reach bar.

14. A potato grader, comprising a supporting frame with foldable legs, pivoted hopper boards, and a hinged deflector board fitted between the hopper boards and provided with means for detachably mounting the same in position.

15. A potato grader, comprising a supporting frame including side bars and foldable legs, and hopper boards pivoted to the side bars, whereby the hopper boards may be folded within the frame when the legs are folded.

16. A potato grader, comprising a supporting frame with foldable legs, a grading chute adapted to rest on the support, and hoppers on the support underriding the chute and each having foldable side boards and a removable deflector board.

17. A potato grader, comprising a grading chute and a support therefor including side bars, foldable leg structures, a reach connecting the leg structures, hopper boards pivoted to the side bars above the reach, and hinged deflector boards fitted between the hopper boards and provided with clips detachably engaging the reach.

18. A potato grader, comprising a supporting frame with foldable legs, a grading chute adapted to rest on the support but removable therefrom, hoppers on the support underriding the chute and each having foldable side boards and a removable deflector board, and a collapsible hopper adapted to be located under the discharge end of the chute and carried by the support, whereby the potato grader as a whole may be collapsed and folded into a small compass for storage or transportation.

19. A potato grader, comprising a supporting frame having foldable legs, a reciprocatory grading chute mounted upon the frame, rockable arms for the chute pivoted to the frame, and a treadle for actuating the arms pivoted to the legs, whereby when the legs are folded the arms and treadle are foldable therewith.

20. A potato grader, comprising a frame having foldable legs, a grading chute removably mounted thereon, means foldable with the legs for varying the inclination of the chute, and hopper structures below the chute foldable with the frame, whereby the potato grader as a whole may be collapsed and folded into a small compass.

21. In a potato grader, a hopper comprising end members and face members, and hinges connecting said members, one of the hinges having a removable pintle upon the removal of which the entire hopper may be folded flat for storage.

In testimony, that I claim the foregoing as my own, I have hereto affixed my signature.

CHARLES JENKINS.